United States Patent

Rocher et al.

[15] 3,657,699

[45] Apr. 18, 1972

[54] MULTIPATH ENCODER-DECODER ARRANGEMENT

[72] Inventors: Edouard Y. Rocher, Ossining; Stanley E. Schuster, Granite Springs, both of N.Y.

[73] Assignee: International Business Machines Corporation, Armonk, N.Y.

[22] Filed: June 30, 1970

[21] Appl. No.: 51,260

[52] U.S. Cl. ........................340/146.1, 178/22, 340/347 DD

[51] Int. Cl. ........................................................G08c 25/00

[58] Field of Search ..................340/146.1, 347 DD; 178/22; 307/221, 222, 223, 224

[56] References Cited

UNITED STATES PATENTS

| | | | |
|---|---|---|---|
| 3,456,200 | 7/1969 | Bos | 307/224 X |
| 3,515,805 | 6/1970 | Francassi et al. | 178/22 |
| 3,493,872 | 3/1970 | Sepe | 307/224 X |
| 3,155,818 | 11/1964 | Goetz | 340/146.1 X |
| 2,802,047 | 8/1957 | Hagelin | 178/22 |
| 3,557,307 | 1/1971 | Hagersten | 178/22 |
| 3,460,112 | 8/1969 | Bobeck et al. | 178/22 X |

*Primary Examiner*—Charles E. Atkinson
*Attorney*—Hanifin and Jancin and T. J. Kilgannon, Jr.

[57] ABSTRACT

A multipath encoder-decoder arrangement which consists of a plurality of storage devices such as memory cells, for example, which can be shifted from one series configuration into at least a second series configuration. The storage devices or at least a portion of them are switched from a first series path to a second series path. In one configuration, the outputs of all the storage devices are switched to the input of a succeeding storage device in a first path to the input of a different storage device in a second series path. In another embodiment, only a portion of the storage devices in one path are switched to form a series arrangement of storage devices in a second path in conjunction with fixed interconnections between certain other of the storage devices. By simply switching between paths, the order of information can be changed, i.e., interleaved, in such a way that errors which occur in bursts when transmitting data are spread out over the entire message with an inter-error space large enough to improve error correction. By providing control means which controls the shifting of data along the series configurations and the switching between configurations, in accordance with a given key, it is possible to scramble transmitted data at various levels of complexity. The complexity at one level, for example, is provided by a feedback loop connected between the input and output of the series configurations which permits data held in the series paths to be changed in both position and polarity. Another level of complexity can be achieved by modifying the key with another key which has been logically combined with previously transmitted encoded data. After transmission, the data is received and unscrambled in a similar encoder-decoder arrangement except that the decoding process is effectively reversed.

17 Claims, 5 Drawing Figures

INVENTORS
EDOUARD Y. ROCHER
STANLEY E. SCHUSTER
BY Thomas J. Kilgannon Jr.
ATTORNEY

MULTIPATH ENCODER-DECODER ARRANGEMENT

BACKGROUND OF THE INVENTION

1. Field of the Invention

This invention relates generally to interleaving and encoding arrangements which utilize shift registers for operating on data which is to be interleaved or scrambled. More specifically, it relates to interleaving and scrambling arrangements wherein a plurality of storage elements arranged in a series configuration and containing data may be simply switched into at least a second series configuration to provide, at its output, data which is at least changed in order from its input order. Still more specifically, it relates to an arrangement wherein both the order and kind of information may be changed by shifting and switching the stored information via a feedback path between the output and input of the arrangement in accordance with a desired pattern or key. Finally, means are provided for modifying the key including logical means for combining a key and previously transmitted encoded data to modify the key which ultimately controls the shifting along and switching between the series configurations of the encoder-decoder arrangement.

2. Description of the Prior Art

Storage devices serially arranged and capable of being shifted are well known in the prior art. Their use to permit interleaving and scrambling of information is known in the prior art as exemplified by U.S. Pat. No. 3,278,729 issued Oct. 11, 1966, in the name of R. T. Chien and assigned to the same assignee as the present invention. This patent shows the introduction of information into an m x m shift register. However, each data block is entered into the shift register row-by-row under control of logical AND gates. The data is then removed column-by-column on a bit-by-bit basis. In this manner, interleaving of the data, that is, the order of its output is changed from the order of its input, is accomplished. In the patent, the output of the data is controlled by AND gates, whereas in the present application, no special circuitry is required other than the means for switching between at least first and second paths. Also, in the patent, the input to the registers is controlled via logical circuitry whereas the present disclosure requires only conventional series shifting.

Other known encoding techniques utilize delay lines and information is scrambled by changing the positions of stored bits with respect to an input position each time a new bit is stored. This scrambling arrangement incorporates a magnetic wire and means for propagating reverse domains therein in first and second directions in a coded manner to encode sequential information for transmission. With respect to this last-mentioned prior art, the present disclosure does not utilize magnetic wire but rather utilizes conventional shift registers arranged in series paths to accomplish both interleaving and encoding at any desired level of complexity. Thus, while interleaving and scrambling as techniques are well known in the prior art, the present application appears to accomplish both interleaving and scrambling in a manner which is both simple and economical utilizing novel shift register configurations.

SUMMARY OF THE INVENTION

The multipath shift register encoding-decoding arrangement of the present invention, in its broadest aspect, comprises a plurality of storage devices serially connected in a first configuration and, means connected to at least a portion of the storage devices for switching from the first configuration to at least a second series configuration. Input and output means are connected to the first and second configurations for applying and removing a train of data to and from at least one of the configurations. Shifting means connected to each of the storage devices for shifting data to and from the storage devices is also provided. Control means connected to the switching and shifting means to control the switching of data between the configurations and the shifting of data within the configurations in accordance with a key is also provided. Included in the means for controlling the shifting of data between the input and the output of the configurations is a means for recirculating the data from the output to the input to change the position of the data within the configurations. Other means for recirculating data from the output to the input of the configuration to change the position and the kind of data in the configuration is also provided. Finally, modification means connected to the control means are provided for modifying the key utilized in the shifting and switching of data within and between configurations in accordance with a preselected pattern.

In accordance with more particular aspects of the invention, the means connected to at least a portion of said storage devices for switching the first configuration to at least a series configuration includes fixed interconnection means connected between the storage devices different from said at least a portion of said storage devices. Also, the means connected to at least a portion of the storage devices for switching includes means for switching the output of each of the storage devices to the input of a succeeding device in the first configuration to the input of a different storage device in at least a second configuration. The switching means thus connected includes a switch having at least two positions connected to the output of each of the storage devices, the switch in one position being connected to the input of another storage device to form the first series configuration and the switch in another position connected to the input of a storage device different from the above-mentioned storage device to form at least a second series configuration. The means for recirculating data to change only the position or the position and kind of data in the configurations includes a feedback path for the former and a feedback path with an inverter disposed serially therein for the latter. The latter, of course, changes the polarity of the feedback data. The means for logically combining the key with a previously transmitted data train includes such logical elements as exclusive OR logic circuits and AND logic circuits. In describing the invention, a coordinate array of storage devices having either first and second zig-zag series paths and first and second serpentine series paths are utilized. Both the zig-zag and serpentine arrangements can be characterized as having horizontal first paths and vertical second paths in which the shiftable storage elements are serially disposed depending upon the condition of the means for switching between the paths.

It is, therefore, an object of this invention to provide a multipath shift register encoding-decoding arrangement which is simple to fabricate but provides a coded output of high complexity.

Another object is to provide a multipath shift register which provides interleaving to reduce errors sustained in transmitting data.

Still another object is to provide a simple encoding decoding arrangement which is capable of scrambling digital information in such a way that transmission of both data and digitally coded analog information (voice, image...) can be held secure.

The foregoing and other objects, features and advantages of the invention will become apparent from the following more particular description of a preferred embodiment of the invention as illustrated in the accompanying drawings.

DESCRIPTION OF A PREFERRED EMBODIMENT

Figure 1:
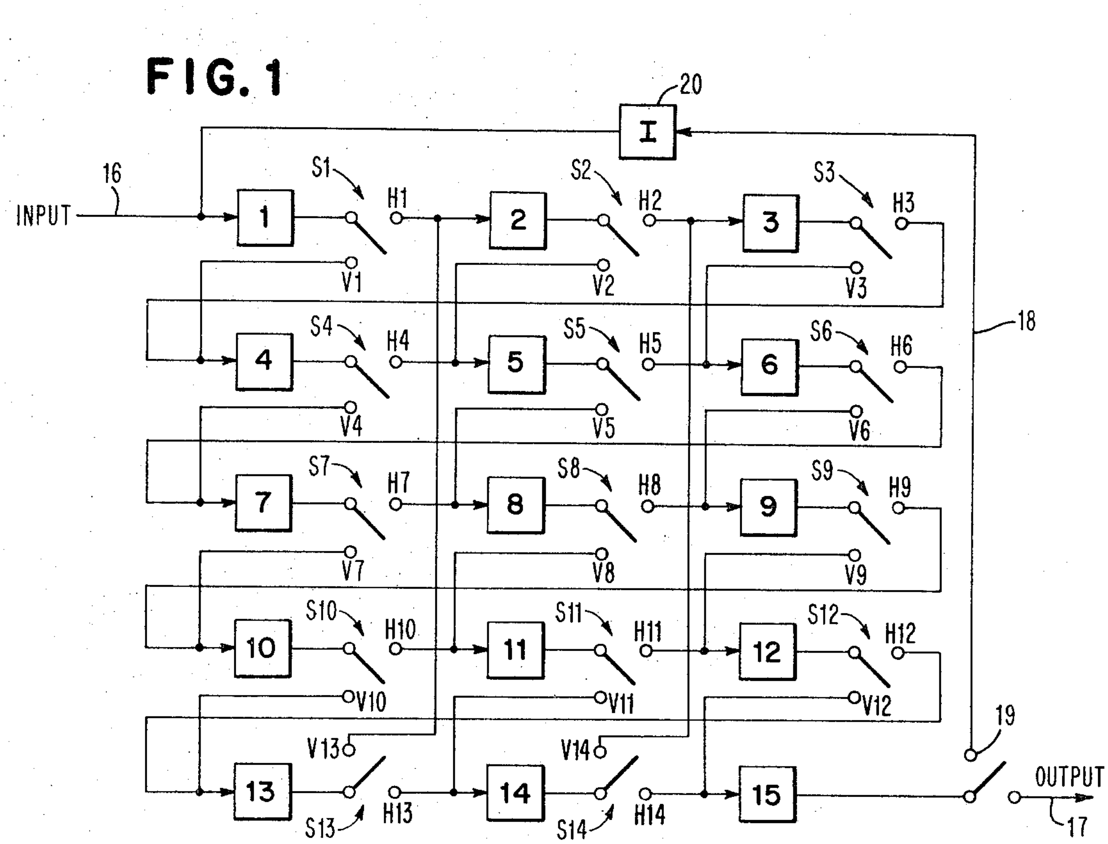
FIG. 1 is a partial schematic-partial block diagram of a multipath shift register wherein a plurality of shiftable storage elements are interconnected in one of at least two possible configurations by switches. In this embodiment, the paths are characterized as horizontal and vertical zig-zag paths.

Referring now to FIG. 1, there is shown therein a partial schematic-partial block diagram of a multipath shift register which may be switched into one of at least two possible configurations. The configurations of the embodiment of FIG. 1 may be characterized as horizontal and vertical zig-zag series configurations or paths.

In FIG. 1, the plurality of shiftable storage elements shown as blocks 1 through 15 are arranged as a coordinate array. Storage devices 1 through 15 which may be any suitable memory element such as a magnetic core or an FET memory cell, may assume one of at least two possible configurations by means of switches S1 – S14 which are connected to the outputs of storage devices 1 – 14, respectively. When switches S1 – S14 are connected to contacts H1 – H14, respectively, storage devices 1 – 15 are serially connected in a horizontal zig-zag configuration and information which is entered via input 16 assumes an order wherein the first bit of information is stored in storage device 15 and the 15th bit of information entered is stored in storage device 1. While not specifically shown in FIG. 1, storage devices 1 – 15 effectively form a series shift register which by applying shifting pulses to each of the storage devices shifts information one storage device at a time through the horizontal zig-zag configuration of FIG. 1. When switches S1 – S14 are actuated to switch from contacts H1 – H14 to contacts V1 – V14, the array of storage devices 1 – 15 assumes another series configuration which may be characterized as the vertical zig-zag series configuration. If, after switching, storage devices 1 – 15 undergo a shifting so that all storage devices are emptied, the sequence or order of the stored information appearing at output terminal 17 is different from the order of the information when it was entered into the horizontal zig-zag configuration.

The input order was: 15. . .10. . .5. . .1. The output order is:

15, 12, 9, 6, 3, 14, 11, 8, 5, 2, 13, 10, 7, 4, 1.

From this, it may be seen that by a simple switching action, the order of the output data has been changed and a new order has been achieved. In other words, interleaving has been accomplished.

A consideration of FIG. 1 should make it obvious that while data is being shifted out via the vertical zig-zag series configuration, a new data block may be simultaneously entered via input 16 in the same vertical mode and after the last bit of the new block has entered the register upon switching back to the horizontal zig-zag series configuration and shifting to remove the data via the horizontal zig-zag series configuration, the "-new" data block is removed in interleaved fashion. Thus, there need be no delay in handling data except for the times required for shifting and switching. It should also be obvious from a consideration of FIG. 1 that the array of storage devices may be of any size limited only by practical considerations. Further, it should also be appreciated that switches S1 – S14 need not be limited to two terminals only but that a plurality of terminals similar to terminals V1 – V14 and H1 –H14 may be arranged to interconnect storage devices 1 – 15 in a plurality of series paths. It should also be obvious that storage devices 1 – 15 need not be arranged as a coordinate array and that the output of any storage device may be interconnected through the input of any other storage device as long as the series relationship of the configurations is maintained.

FIG. 1 also shows a feedback path 18 interconnecting output 17 and input 16 via a switch 19. An inverter 20 serially disposed in feedback path 18 inverts the polarity of data which is recirculated from storage device 15 to the input of storage device 1. The configuration shown in FIG. 1 with feedback path 18 and inverter 20 serially disposed in feedback path 18 to recirculate the data makes it possible to accomplish data scrambling. A block of data first enters the register along one of the series configurations. Next feedback path 18 is closed and via switch 19 data is shifted along another of the series configurations by applying a number of shifting pulses determined by a key which will be described in more detail later. This operation continues with the series configurations alternating and the number of shifting pulses for each configuration being determined by the key. In each series configuration, only that portion of the data which passes through feedback path 18 and inverter 20 is inverted from its original polarity. After a number of shifting operations in alternating series configurations, the scrambled information is quite different in its relative position and polarity from the input information. The scrambled information now passes to output terminal 17 in FIG. 1 for transmission.

If the scrambling is carries out pursuant to a fixed pattern, then information which was shifted into a given storage device in one series configuration will always be shifted to the same different storage device just prior to shifting the information out. This mode is characterized as a linear mode of operation. It has the advantage that errors in the transmission do not propagate (there are as many errors in the unscrambled message as in the scrambled message), but from the point of view of information scrambling, this linear mode does not provide a high degree of security. The present arrangement, however, may be adapted to provide a high degree of security, and such a system will be described later in what follows.

Figure 2:
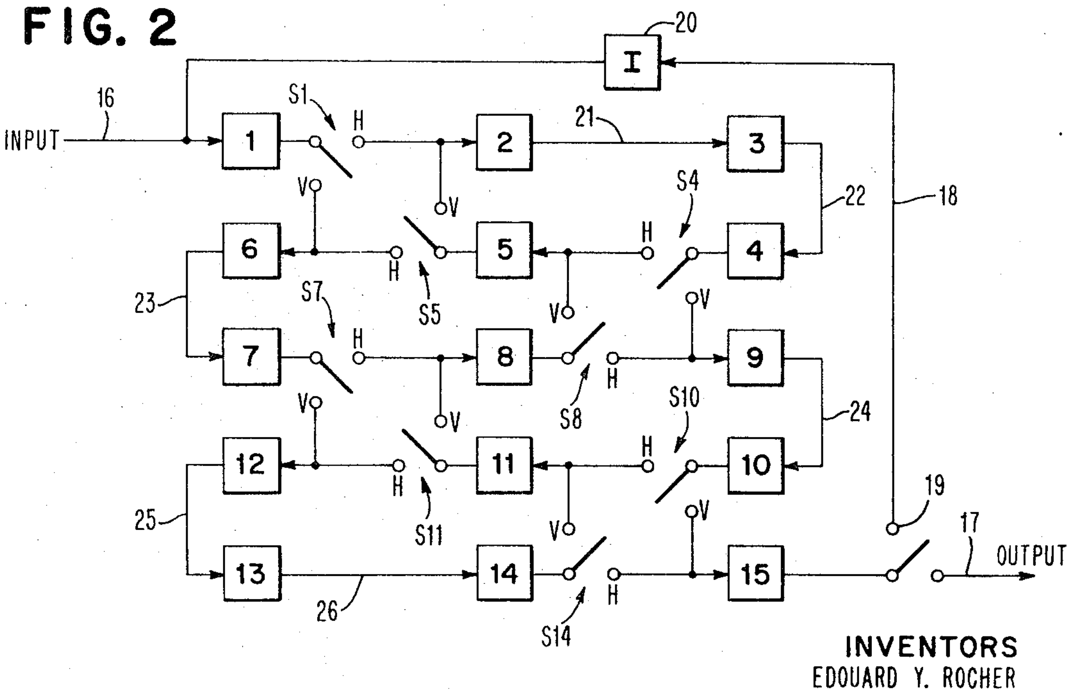
FIG. 2 is a partial schematic-partial block diagram of a multipath shift register wherein a plurality of shiftable storage devices are connected by means of switches and fixed interconnections into one of at least two possible configurations. In this embodiment, the configurations are characterized as horizontal and vertical serpentine configurations.

Referring now to FIG. 2, there is shown a plurality of storage devices 1 – 15 which, using a plurality of switches associated with certain of the storage devices and fixed interconnections between certain other storage devices, can assume one of at least two possible series configurations. The series arrangements shown in FIG. 2 may be characterized as horizontal and vertical serpentine series configurations or paths. The storage devices of FIG. 2 are similar in every respect to the storage devices of FIG. 1. The only difference is in the number of switches utilized and the manner in which the storage devices are interconnected. In FIG. 2, storage devices 2 and 3 are interconnected by fixed interconnection 21; storage devices 3 and 4 are interconnected via fixed interconnection 22; storage devices 6 and 7 are interconnected via fixed interconnection 23; storage devices 9 and 10 are interconnected via fixed interconnection 24; storage devices 11 and 12 are interconnected via interconnection 25 and storage devices 13 and 14 are interconnected via fixed interconnection 26. All the remaining storage devices have their outputs interconnected via switches S1, S4, S5, S7, S8, S10, S11, and S14 to the input of a succeeding device via horizontal or vertical contacts associated with each switch.

Data may be entered into storage devices 1 – 15 which are arranged in a coordinate array in FIG. 2 via input 16 and, with all switches connected to their horizontal contacts, forms a horizontal serpentine series path. Fifteen bits of data take the same order as the numbered shift registers with the first piece of data entered being stored in storage device 15 and the last bit of data entered being stored in storage device 1. Upon switching all switches to their vertical contacts, a new vertical serpentine series path is formed and data passes from the vertical serpentine configuration via output 17 in the following order:

15, 10, 9, 4, 3, 2, 5, 8, 11, 14, 13, 12, 7, 6, 1.

Thus, interleaving is also achieved by the use of switches and fixed interconnections between storage devices arranged in a serpentine configuration. It follows then, that utilizing feedback loop 18 to recirculate and invert data stored in the serpentine configurations that data scrambling is possible. However, because of the serpentine configurations, a higher degree of scrambling may be obtained even though the mode of scrambling is still a linear one. As with FIG. 1, FIG. 2 has been described as having specific series configurations but, it should be appreciated that storage devices 1 – 15 may be interconnected in any fashion as long as series configurations are achieved and data may be switched between and shifted along these series configurations.

The embodiments of FIG. 1 and 2 are attractive because of the simplicity, low cost, and compatability with existing large-scale integration technologies and coding methods. The statistics of data transmission show that generally the majority of errors occur in short bursts which are widely spaced. By utilizing the embodiments of FIGS. 1 and 2 for interleaving bits of data, the error burst is no longer concentrated in a single block of data but is spread over several blocks, thereby reducing the number of errors in any given block. The need of security for data transmission and data storage is also becoming increasingly important. By utilizing the embodiment of FIG. 1 and FIG. 2 to scramble the data, security may also be obtained.

While only the encoding function has been discussed up to this point, it should be obvious that arrangements similar to the arrangements of FIG. 1 and 2 may be utilized at a receiver. At a receiver, the data is operated on in the reverse manner to which it was interleaved or scrambled. Thus, in the interleaving mode, data which was transmitted from a vertical serpentine configuration after entering in a horizontal serpentine configuration is received in a vertical serpentine configuration, and upon switching to the horizontal serpentine configuration, it is shifted out and appears exactly as it did at the input of the transmitter encoding arrangement. As long as shifting and switching operations are carried out at a receiver in the reverse order to which they were carried out at the transmitter, the original information can be recovered completely.

Figure 3:
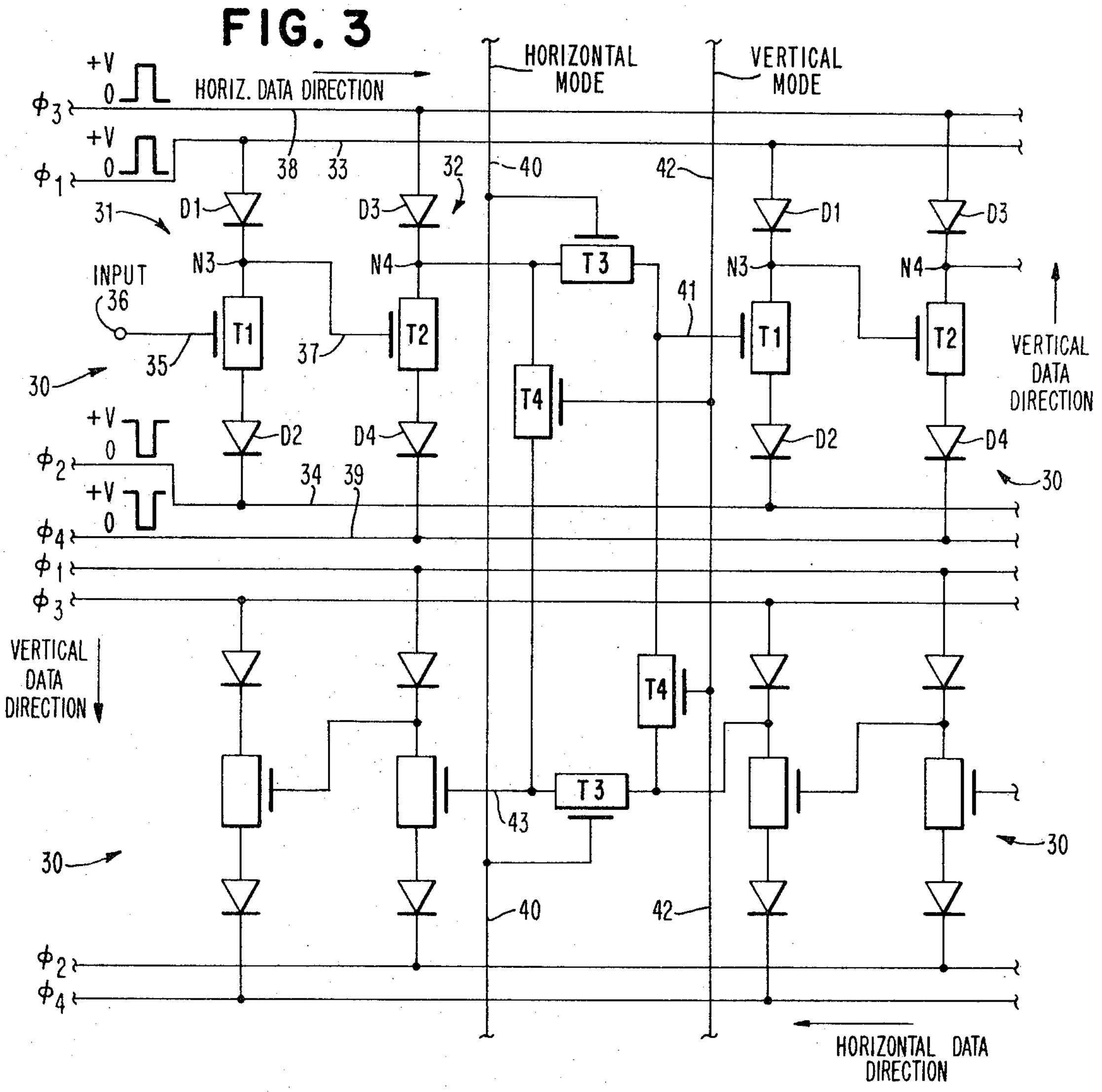
FIG. 3 is a schematic diagram of diode-field effect transistor shift register cells which may be utilized in the practice of the present invention. Also shown are switching means which when actuated switch the shift register cells into one of at least two possible paths.

Referring now to FIG. 3, there is shown therein a portion of a multipath shift register arrangement which utilizes shiftable storage devices consisting of two field effect transistors and four diodes. Also shown are field effect transistor switches which are utilized to switch the memory cells from one series configuration to another series configuration. A detailed description and operation of the memory cells of FIG. 3 is described in a co-pending application, Ser. No. 837,704, filed June 30, 1969 and now U.S. Pat. No. 3,588,528 issued June 28, 1971, in the name of L. M. Terman entitled "A Four Phase Diode-FET Shift Register" and assigned to the same assignee as the present invention.

Referring now to the upper lefthand memory cell of FIG. 3 which consists of diodes D1–D4 and field effect transistors T1 and T2, shift register stage 30 consists of two circuits 31 and 32. Circuit 31 contains a field effect transistor T1 which is connected to diodes D1 and D2. Diode D1 is connected to a pulse voltage source via line 33 and shown as $\phi$1 in FIG. 3. Diode D2 is shown connected to a pulsed voltage source via line 34 and shown as $\phi$2 in FIG. 3. A gate 35 of transistor T1 is shown connected to an input terminal 36 which may be connected to a source of digital data or the output of a shift register stage identical with stage 30. Transistor T1 is also connected via a node N3 to a gate 37 of transistor T2 of circuit 32. In this manner, the gate capacitance of transistor T2 is connected to node N3.

Transistor T2 is shown in FIG. 3 connected to diodes D3 and D4 which, in turn, are connected to pulsed voltage sources via lines 38 and 39, respectively, and labeled therein as $\phi$3 and $\phi$4, respectively. A node N4 disposed between diode D3 and transistor T2 is connected to the inputs of switching transistors T3 and T4, about which more will be said in what follows.

Transistors T1–T4 may be either n-channel or p-channel devices which are well known to those skilled in the semiconductor art. When transistors T1 and T2 are n-channel enhancement mode devices, diodes D1–D4 are placed in the circuit so that they conduct in the direction indicated by the arrow head of their schematic symbol. When the same transistors are p-channel enhancement mode devices, however, diodes D1–D4 are reversed. By applying appropriate polarity pulses from pulsed voltage sources $\phi$1–$\phi$4 as shown in FIG. 3, information applied at input 36 appears at node N4 where it may be switched into one of two possible paths via FET T3 or FET T4. Thus, if transistor T3 is actuated by a pulse on its gate via lead 40, information which is present on node N4 of circuit 32 will be applied via actuated FET T3 to the gate 41 of the shift register stage 30 immediately to the right of the leftmost shift register stage 30. If, however, transistor T4 is actuated by a pulse on its gate via line 42, information appearing at node N4 of circuit 32 is transmitted via FET T4 to the gate 43 of the shift register stage 30 immediately beneath the upper leftmost shift register stage 30. From the foregoing, it should be clear that shift register stages 30 may be substituted for the blocks 1–15 in both FIGS. 1 and 2 and that devices similar to FET T3 and T4 may be substituted for the switches wherever necessary. It should also be obvious that data may be shifted along a given series configuration by properly activating pulse sources $\phi$1–$\phi$4 and that switching between series configurations may be accomplished by appropriately pulsing the gates of switching transistors similar to FET's T3 and T4 as shown in FIG. 3. As indicated hereinabove, a detailed explanation of the operation of circuits 31 and 32 may be had by referring to the above-mentioned co-pending application.

Figure 4:
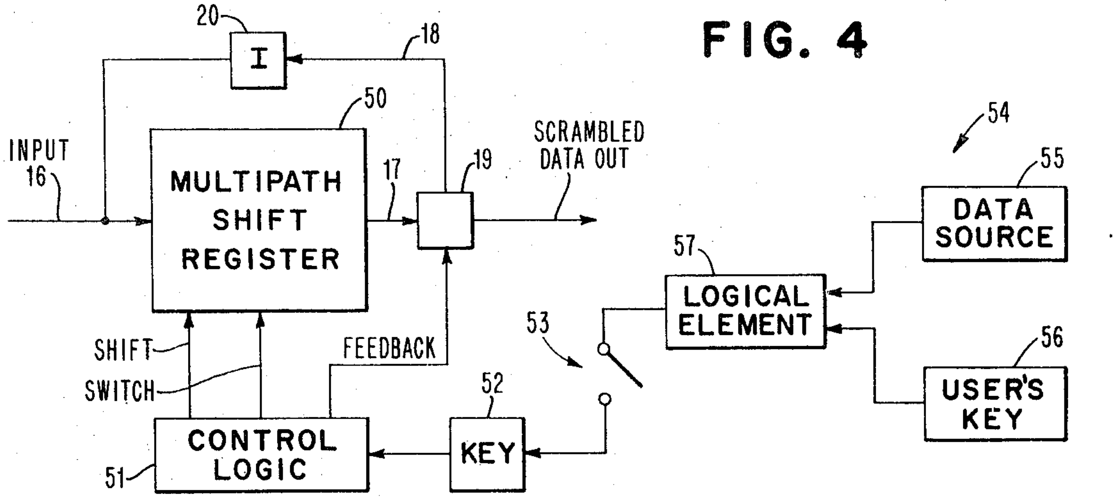
FIG. 4 is a block diagram of a multipath shift register of the present invention utilized as a data scrambler. The multipath shift register is shown in conjunction with a control logic which controls the occurrence of shifting and switching as well as the use of a feedback means for recirculating data under control of a key. Also shown are means for modifying the key utilizing a logical element which combines the users key with previously transmitted data to provide for high security transmission of information.

Referring now to FIG. 4, there is shown a block diagram of a multipath shift register utilized as a data scrambler. The shift register is shown in conjunction with control logic which controls the occurrence of shifting and switching as well as the use of a feedback means for recirculating data under control of a key. Also shown are means for modifying the key utilizing a logical element which combines the user's key with previously transmitted data to provide for high security transmission of information.

The multipath shift register shown in block 50 of FIG. 4 is preferably the horizontal and vertical serpentine arrangement discussed in connection with FIG. 2 of the present invention. Data is applied to either the horizontal or vertical serpentine paths via input 16. A switch 19 connects the output 17 of the multipath shift register of block 50 to input 16 via feedback path 18 and inverter 20. Control logic 51 under control of a key 52 applies shifting and switching pulses to the shift register of block 50 and to switch 19 via leads labeled shift, switch and feedback. Control logic 51 may be a counter which applies appropriately timed pulses to each of its outputs under control of key 52 which determines the time of occurrence of pulses on the output leads of control logic 51. A switch 53 couples a means 54 for modifying key 52 in accordance with a predetermined pattern.

With switch 13 open, i.e., with the key stored in 52, data applied via input terminal 16 to the shift register of block 50 is scrambled in the following manner:

1. A block of $m \times m$ bits is entered into the shift register in the horizontal serpentine series configuration while a previously scrambled block of data is being transmitted from output 17 via switch 19 to a transmitter (not shown).
2. Feedback loop 18 is closed by actuating switch 19 via feedback connection to control logic 51 which, in turn, is controlled by key 52.
3. The data are scrambled (in position and polarity) by a series of high speed alternate vertical and horizontal shifting and switching operations as determined by key 52 and implemented by control logic 51 via shifting and switching leads to shift register 50.

4. The scrambled block is then transmitted by opening feedback loop 18 by means of switch 19 and transmitted in the horizontal mode, for example.
5. The scrambled data is received in a decoder shift register similar in every way to the shift register of block 50 in the horizontal serpentine series configuration.
6. Unscrambling can be performed using the inverse transformation of the scrambling operation.

To determine the inverse transformation of the scrambling operation, the scrambling operation can be represented by the following transformation:

$$M' = H^{h_n}_{n} V^{r_n}_{n} H^{h_{n-1}} \ldots V^{r_2}_{2} H^{h_1}_{1} V^{r_1}_{1} M \qquad (1)$$

where:
M' is the scrambled block
M is the initial block $$V^{r_i} \text{ or } (H^{h_i})$$

represents $v_i(h_i)$ successive vertical (horizontal) shifts. The structure of the X–Y shift register (FIG. 2) is such that the elementary transformations V and H do not commute; consequenty, the unscrambling operation is:

$$M = V^{-r_1}_{1} H^{-h_1}_{1} \ldots H^{-h_n}_{n} M' \qquad (2)$$

where $$V^{-r_1}_{1} = V^{2m \times n - r_1} \qquad (3)$$

because 2 $m \times n$ vertical (horizontal) shifts are equivalent to unity transformation with the inverter in the feedback loop ($m \times n$ shifts only with no inverter).

For continuous operation, two X–Y shift registers have to be used in sequence (1) scrambling and (2) input and output of data. The key which is specified by the $v_i$ and $h_i$ of (1) is limited by the number of high speed horizontal and vertical shifts, which can be performed during the time the other register is being filled (and/or emptied).

The power of the scrambling operation is illustrated by assigning the following typical values to the arrangements of FIG. 4:

$m = 31, n = 15, n \times 465$
Input rate $R_L = 2kb/s$
Internal clock rate $R_H = 1$ MHz In the example chosen, $(R_H/R_L) \times m \times n = 500 \times 465$ such operations are possible. Since unscrambling can necessitate up to 2 $m \times n$ = 930 shifts, the maximum number of key characters ($v_i, h_i$ = 1 to 930) is $K = (R_H/2R_L) = 250$ and therefore the corresponding number of scrambling possibilities are:
$(2 \times 2 \times m \times n)^K = (2 \times 2 \times 465)^{250} \approx 10^{800}$
which is much larger than the information content of the register ($2^{465} \approx 10^{150}$). In fact, the keys would use a much smaller number of characters (for example, 20 characters of 10 digits).

The system of FIG. 4 with means 54 for modifying key 52 disconnected by opening switch 53 is extremely attractive because of its simplicity. The security provided should suffice for nearly all commercial applications. If better security is required, based upon an assumption that someone has access to the system and is able to send any given data pattern, a different key may be used for each message. For example, after the transmission of each message, one or a number of the key characters could be implemented in accordance with a desired pattern. Another more sophisticated approach consists of a means 54 for modifying key 52 in accordance with a predetermined pattern. Means 54 in FIG. 4 consists of a data source 55, for example, a shift register which provides storage for previously entered data. The output of data source 55 is combined with the user's key obtained from a storage element and shown as block 56 in FIG. 4 with a logical element 57 which may be, for example, an exclusive OR gate or an AND gate. Key 52 can now be controlled by the output of logical element 57 which is derived by some logical combining of data from source 55 and the known user's key from block 56 by simply closing switch 53. In this manner, a new key is generated each time a block of data is transmitted. This information can then be recovered at a receiver decoder because the user's key is provided at each receiving station. This technique provides a high degree of security since both the key and the preceding message are necessary to decipher the incoming information. A system in which a variable key is used which depends upon the preceding block of data may be characterized as a nonlinear system. In a linear system, it should be recalled, where the key is fixed, a bit of data entered in one shift register stage position will always wind up at the same different shift register stage prior to transmission after a series of shifting and switching operations have taken place. In a non-linear system, a given piece of data which appears at a given shift register position will always appear at a different shift register stage after scrambling and just prior to transmission. A simplified description of a non-linear system is given in what follows in conjunction with FIG. 5.

Figure 5:
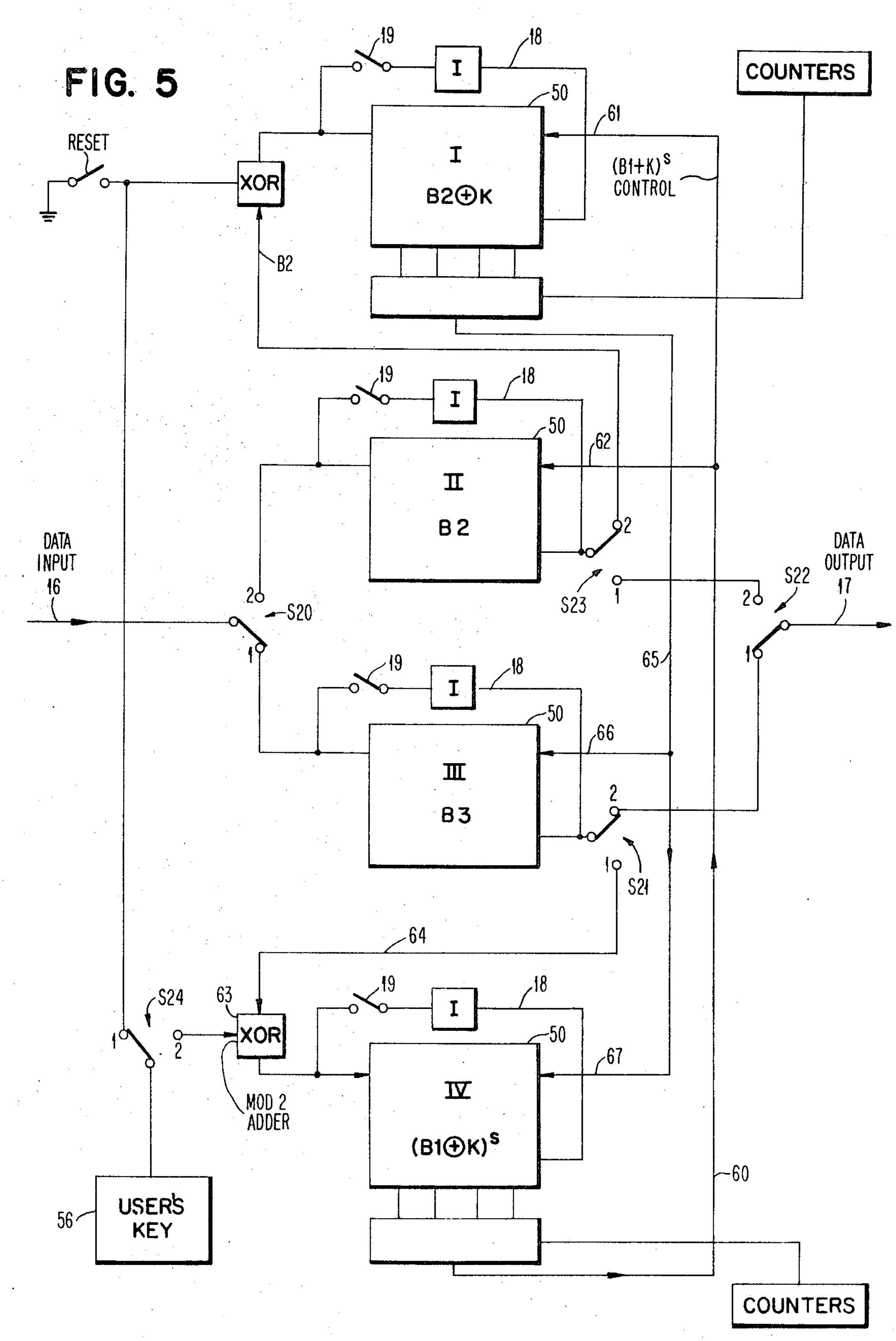
FIG. 5 is a partial schematic-partial block diagram of a high security transmitting arrangement utilizing multipath shift registers wherein the key is modified in accordance with a desired pattern.

FIG. 5 is a partial schematic-partial block diagram of a high security non-linear transmitting arrangement utilizing multipath shift registers wherein the key is modified in accordance with a predetermined pattern.

FIG. 5 shows a plurality of shift registers shown as blocks 50 in FIG. 5 and further identified by Roman numerals I–IV therein. Each multipath shift register stage contains $m \times n$ bits. The interaction and interrelationship of multipath shift registers 50 will become clear as the following description of the operation of a non-linear scrambling operation is described. In the arrangement to be described, the variable keys are obtained by adding (modulo 2) the user's key to the preceding data block and scrambling. Encoding of input data is obtained in the following manner:

1. A block of data of $m \times n$ bits B3 is entered into register III via input 16 and contact 1 of two-position switch S20. At the same time, the following events take place:
   a. a previously ciphered block of data $(B1)^s$ is transmitted from shift register III via contact 2 of a two-position switch S21 and contact 1 of a two-position switch S22 to output terminal 17.
   b. block B2 held in register II and (B2 ⊕ K) held in register I are scrambled with a scrambled key $(B1 \oplus K)^s$ stored in register IV. This scrambling occurs by applying the output of register IV via lead 60 in parallel to registers I and II via control leads 61 and 62, respectively. Control leads 61 and 62 are connected to the shifting and switching controls for registers I and II. The scrambling generates a new key in register I, $(B2 \oplus K)^2$.
2. When the last bit of block B3 has entered register III, two events occur simultaneously:
   a. switch S20 is actuated to contact 2 and a data block B4 enters register II; the ciphered block B2 is transmitted via contact 1 of switch S23 and contact 2 of switch S22. The clock is equal to the data rate.
   b. the feedback path 18 of register III is closed via switch 19 and switch S21 is switched to contact 1; block B3 then enters a modulo 2 adder (exclusive OR) 63 via lead 64 with switch S24 in position 2; the output of adder 63 is applied to register IV and after $m \times n$ shifts at a very high clock rate, the contents of register III exclusive OR (combined in circuit 63) with the user's key shown at block 56 and are stored in register IV.
3. When the last bit of information has entered register IV, registers III and IV are simultaneously scrambled with the key $(B2 + K)^s$ stored in register I via lead 65 and control leads 66 and 67 which control the shifting and switching of these registers.

In deciphering a block, $(B2)^2$, for example, the key $(B1 + K)^s$ is to be reconstructed. Since the scrambled block B1 equal to $(B1)^s$ has already been received and deciphered, the initial block B1 is therefore known and the key $(B1 + K)^s$ can be reconstructed. Then, the unscrambling operation is straightforward and can be carried out in the same manner as described in connection with FIG. 4 hereinabove.

From the foregoing, it should be clear that a variable key for each message can be obtained relatively simply. Using the arrangement of FIG. 5, a large number of user's key combination are available. If, for example, $m \times n$ equals 63, there are $10^{20}$ different key combinations. Also, a high degree of security is obtained since a key and a preceding message are necessary to decipher a received transmission.

The arrangement of FIG. 5 may be fabricated using existing large scale integration technology techniques. The entire system wherein the registers are identical, may be integrated on a single semiconductor chip. If the size of the registers is 63 bits, for example, approximately 300 circuits (bits) would be required. For 135 bit registers, approximately 700 circuits (bits) would be required.

The foregoing has described multipath shift register arrangements for interleaving or scrambling. The arrangements provide for efficient scrambling or interleaving utilizing commercially available hardware. The arrangements are low cost, high speed and are compatible with both existing large scale integration technologies and with existing coding methods.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A multipath shift register encoding-decoding arrangement comprising:

a plurality of storage devices serially connected in a first configuration, and means connected to at least a portion of said storage devices for switching said first configuration to at least a second series configuration said switching means including means for switching a terminal of each of said storage devices of said at least a portion from a terminal of another storage device in said first configuration to a terminal of a different storage device in said at least said second configuration.

2. An arrangement according to claim 1 further including fixed interconnection means connecting storage devices different from said at least a portion of said storage devices to storage devices of said at least a portion.

3. An arrangement according to claim 1 wherein said means connected to said at least a portion of said storage devices for switching includes means for switching the output of each of said storage devices of said at least a portion from the input of a succeeding device in said first configuration to the input of a different storage device in at least said second configuration.

4. An arrangement according to claim 1 further including input means connected to said first and second configurations for applying a train of data to at least one of said configurations.

5. An arrangement according to claim 3 wherein said means for switching the output of each of said storage devices includes a switch having at least two positions connected to the output of each of said storage devices of said at least a portion, said switch in one position being connected to the input of another storage device to form said first series configuration, said switch in another position connected to the input of a storage device different from said another storage device to form said at least a second series configuration.

6. An arrangement according to claim 4 further including output means connected to said first and second configurations for removing a train of data from at least one of said configurations.

7. An arrangement according to claim 6 wherein the order of said storage devices in said first and second configurations is different.

8. An arrangement according to claim 6 further including means connected to said storage devices for shifting data to and from said storage devices.

9. An arrangement according to claim 8 further including means connected to said switching means and to said shifting means to control the switching of data between said configurations and the shifting of data within said configurations in accordance with a key.

10. An arrangement according to claim 9 wherein said means to control the shifting of data includes means connected between the input and output of said configurations for recirculating data from said output to said input to change the position of said data in said configurations.

11. An arrangement according to claim 9 wherein said means to control the shifting of data includes means connected between the input and output of said configurations for recirculating data from said output to said input to change the position and kind of said data in said configuration.

12. An arrangement according to claim 9 wherein said means to control the shifting and switching of said data within and between said configurations in accordance with said key further includes means connected to said control means for modifying said key in accordance with a pre-selected pattern.

13. An arrangement according to claim 10 wherein said means for recirculating includes a feedback path.

14. An arrangement according to claim 11 wherein said means for recirculating information to change the position and kind of said data includes a feedback path and an inverter serially disposed in said feedback path to change the polarities of said data.

15. An arrangement according to claim 12 wherein said means for modifying said key in accordance with a pre-selected pattern includes means for logically combining said key with a previously transmitted data train.

16. An arrangement according to claim 15 wherein said means for logically combining includes an exclusive OR circuit.

17. An arrangement according to claim 15 wherein said means for logically combining includes an AND circuit.

* * * * *